(12) United States Patent
Washburn et al.

(10) Patent No.: US 10,046,999 B2
(45) Date of Patent: Aug. 14, 2018

(54) WATER TREATMENT SYSTEMS AND METHODS

(71) Applicant: NuvoH2O, LLC, Kaysville, UT (US)

(72) Inventors: Byron Laird Washburn, Fruit Heights, UT (US); Sean Terry, Gilbert, AZ (US)

(*) Notice: Subject to any disclaimer, the term of this patent is extended or adjusted under 35 U.S.C. 154(b) by 786 days.

(21) Appl. No.: 14/376,374

(22) PCT Filed: Jan. 31, 2013

(86) PCT No.: PCT/US2013/024085
§ 371 (c)(1),
(2) Date: Aug. 1, 2014

(87) PCT Pub. No.: WO2013/116481
PCT Pub. Date: Aug. 8, 2013

(65) Prior Publication Data
US 2015/0183672 A1    Jul. 2, 2015

Related U.S. Application Data

(60) Provisional application No. 61/594,286, filed on Feb. 2, 2012.

(51) Int. Cl.
*C02F 1/66* (2006.01)
*C02F 5/08* (2006.01)
(Continued)

(52) U.S. Cl.
CPC .............. *C02F 5/086* (2013.01); *C02F 1/008* (2013.01); *C02F 1/688* (2013.01); *C02F 5/10* (2013.01);
(Continued)

(58) Field of Classification Search
CPC .......... C02F 1/688; C02F 5/086; C02F 5/105; C02F 5/10; C02F 1/008; C02F 2201/006;
(Continued)

(56) References Cited

U.S. PATENT DOCUMENTS 2,142,947 A * 1/1939 Kretzschmar ........... C02F 1/688
137/1
3,907,688 A * 9/1975 Close ................... B01D 35/043
137/625.47
(Continued)

FOREIGN PATENT DOCUMENTS

DE   10 2004 025259 A1   12/2005
JP   2005-296774 A       10/2005
(Continued)

OTHER PUBLICATIONS

Extended European Search Report for corresponding European Application No. 12183364.4, dated Sep. 10, 2013 (12 pages).
(Continued)

*Primary Examiner* — Matthew O Savage
(74) *Attorney, Agent, or Firm* — Brinks Gilson & Lione; Ryan L. Marshall; Jonathan Hartley

(57) ABSTRACT

Industrial and residential water treatment systems and devices are disclosed for use in preventing hard water buildup or in removing such buildup. The systems and devices include fixed and removable components for delivering water treatment composition. In addition, novel water treatment compositions and methods of treating water are disclosed.

10 Claims, 7 Drawing Sheets

(51) Int. Cl.
*C02F 1/68* (2006.01)
*C02F 5/10* (2006.01)
*C02F 1/00* (2006.01)

(52) U.S. Cl.
CPC ........ *C02F 5/105* (2013.01); *C02F 2201/006* (2013.01); *C02F 2209/06* (2013.01); *C02F 2209/40* (2013.01); *C02F 2301/043* (2013.01)

(58) Field of Classification Search
CPC ............ C02F 2209/40; C02F 2301/043; C02F 2209/06; B01J 47/024
See application file for complete search history.

(56) References Cited

U.S. PATENT DOCUMENTS

| | | | |
|---|---|---|---|
| 4,626,350 A * | 12/1986 | Reid | B01D 35/30 210/282 |
| 4,800,018 A | 1/1989 | Moser | |
| 5,707,536 A * | 1/1998 | Meissner | B01D 24/12 210/266 |
| 5,876,610 A * | 3/1999 | Clack | B01D 35/143 210/282 |
| 6,241,884 B1 | 6/2001 | Hansen | |
| 7,297,257 B1 | 11/2007 | Terry | |
| 2002/0117430 A1* | 8/2002 | Navarro | C02F 1/008 210/85 |
| 2007/0072784 A1 | 3/2007 | Corradini et al. | |
| 2007/0267358 A1 | 11/2007 | Stanford et al. | |
| 2010/0025339 A1 | 2/2010 | Lundquist et al. | |
| 2010/0294724 A1* | 11/2010 | McCague | B01J 20/2805 210/687 |
| 2011/0284479 A1 | 11/2011 | O'Brien et al. | |

FOREIGN PATENT DOCUMENTS

| | | |
|---|---|---|
| WO | WO 2011/066866 A1 | 6/2011 |
| WO | WO 2011/163361 A1 | 12/2011 |

OTHER PUBLICATIONS

International Search Report for corresponding International Application No. PCT/US2013/024085, dated May 30, 2013 (3 pages).
Partial Search Report for corresponding European Application No. 12183364.4, dated May 10, 2013 (3 pages).

\* cited by examiner

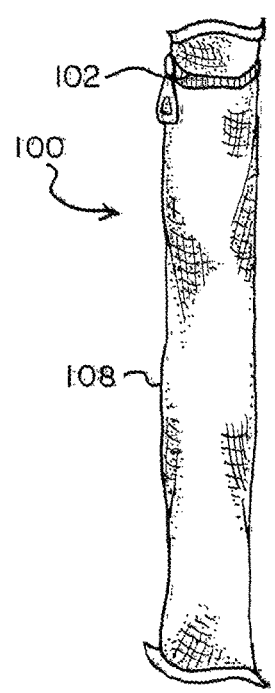
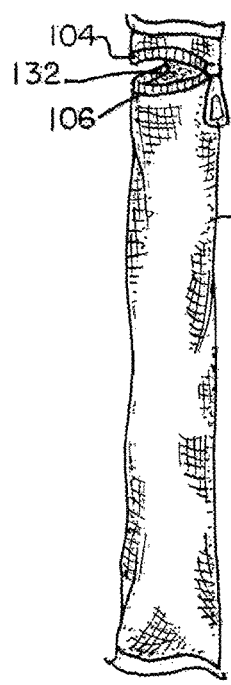
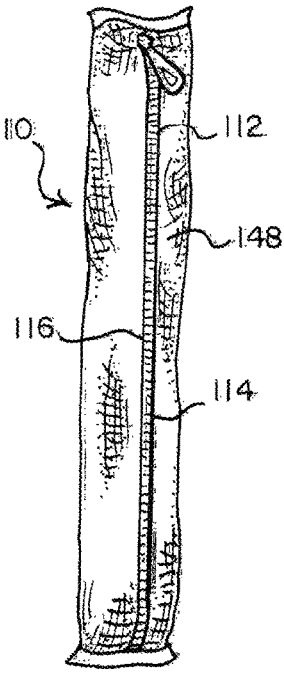
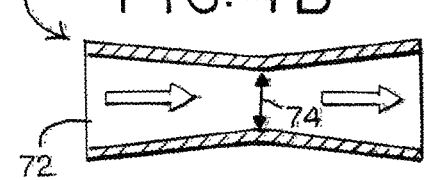
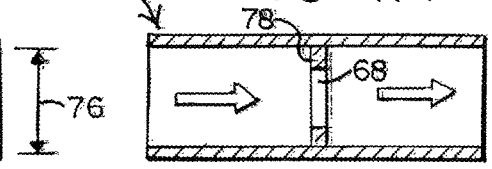
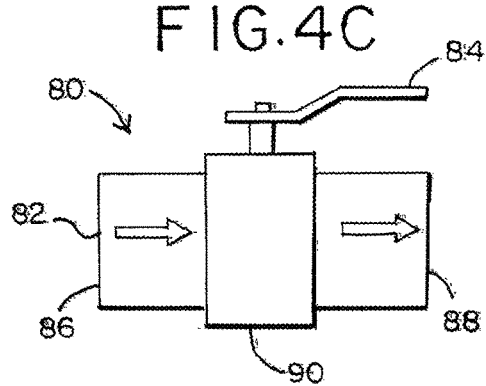
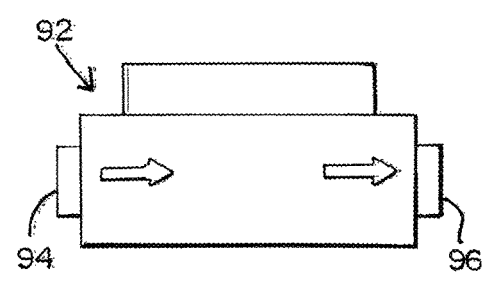

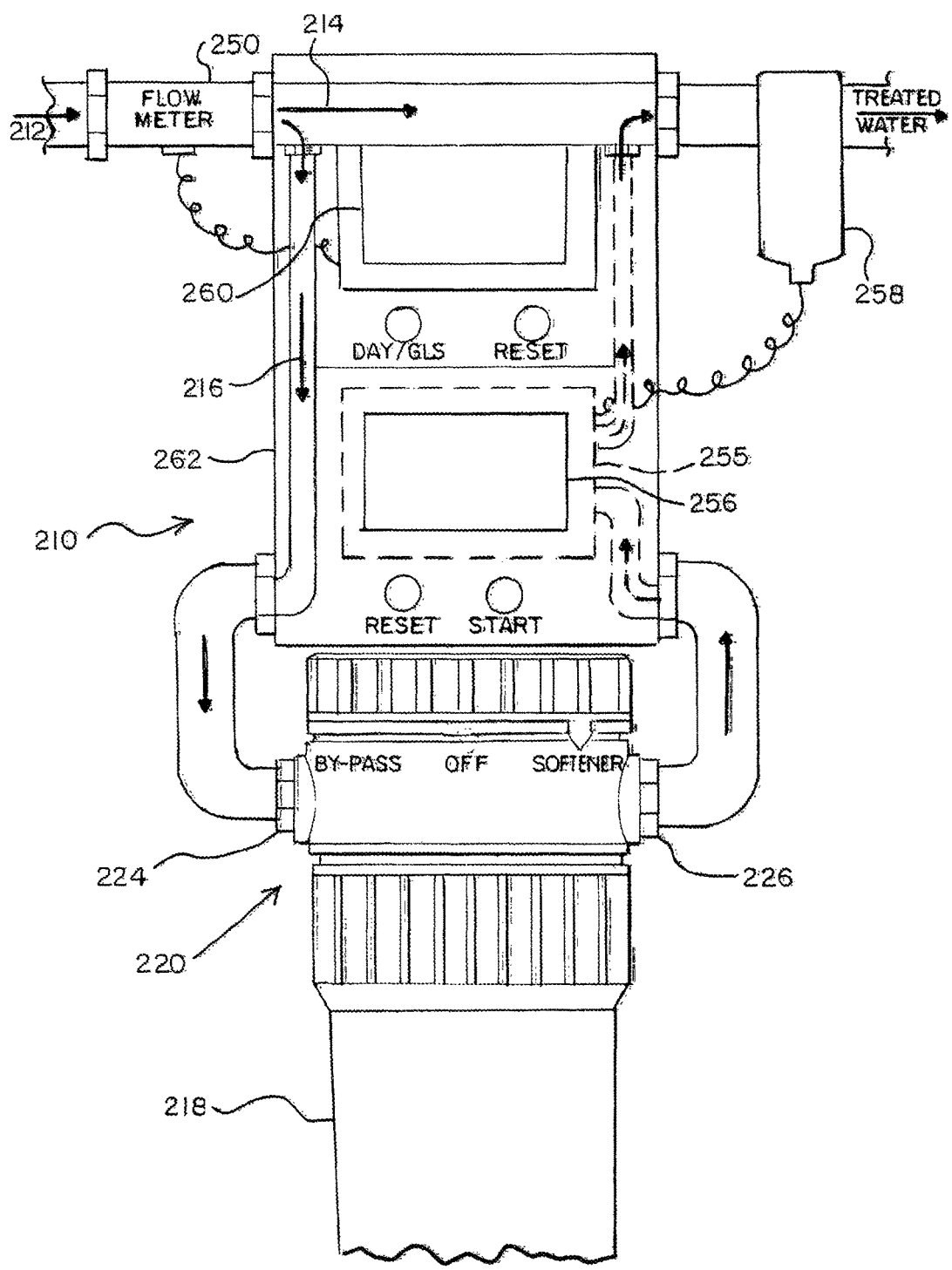

WATER TREATMENT SYSTEMS AND METHODS

REFERENCE TO EARLIER FILED APPLICATION

This application is a 371 national phase of PCT/US2013/024085, filed Jan. 31, 2013, and claims the benefit under 35 U.S.C. § 119(e) of U.S. Provisional Patent Application No. 61/594,286, filed Feb. 2, 2012, and titled "WATER TREATMENT SYSTEMS AND METHODS," which is incorporated, in its entirety, by this reference.

BACKGROUND

The present invention relates to water treatment systems and methods of treating water. More specifically, the invention relates to systems and devices for industrial and residential water softening using at least two streams of water, one of which carries water treatment composition to the other.

Fresh water supplies across the world are typically derived from underground aquifers or streams originating in terrain rich with alkaline earth metals, including calcium ($Ca^{2+}$) and magnesium ($Mg^{2+}$). As a result, much of the fresh water available for industrial or residential use is enriched with cationic mineral with an alkaline pH. Such water is frequently referred to as "hard water."

A number of technologies have been developed to soften water—that is to remove or replace alkaline earth metals and decrease the pH of the fresh water. Water treatment systems for such purposes typically substitute calcium and magnesium ions contained in hard water with alkaline ions such as sodium ($Na^+$) and potassium ($K^+$). For this softening function, conventional water softeners often include a softening tank to soften raw water. The softening tank is filled with an ion exchange resin loaded with sodium or potassium ions. The sodium and potassium ions exchange with the calcium and magnesium ions in the fresh water supply. Eventually, however, the ion exchange resin become saturated with the alkaline earth metals and must be recharged—stripped of the unwanted ions and replaced with more alkaline ions. The regeneration process often involves discharging a costly and wasteful amount of water which is an increasingly important commodity. Also, this discharged water contains sodium or potassium chloride used to regenerate the ion exchange resin. In addition, many water systems were not built with water treatment systems for softening the water. Such systems often suffer from hard water buildup and become occluded.

There is, therefore, a need to provide water treatment systems that conserve the amount of fresh water consumed to soften hard water. Moreover, there is a need to provide water treatment systems that can remove hard water buildup already existing in a water system.

SUMMARY

In one aspect, a water treatment device is disclosed. The water treatment device can be connected to a water supply including (a) components fixed in location to the water supply including: (1) channels for conveying a plurality of water streams, including a main stream and a subsidiary stream; (2) an inlet connecting the water supply to the treatment device for allowing water from the water supply to enter the treatment device, and an outlet through which water having water treatment composition leaves the treatment device; (3) a flow control device capable of controlling the flow rate of the subsidiary stream through the water treatment device; (b) at least one removable component that at least in part defines a chamber having a flow path for the subsidiary stream through the chamber, wherein the chamber contains water treatment composition.

In some embodiments, the flow path through the chamber is designed to maximize contact between the subsidiary stream and the surface of the water treatment composition. In some embodiments, the water treatment device includes at least two compartments, the first compartment containing water treatment composition, and the second compartment containing the subsidiary stream. In some embodiments, the water treatment device further comprises a removable cartridge capable of fitting within the first compartment, the cartridge containing water treatment composition.

In another aspect, a water treatment system is disclosed. The water treatment system includes (a) a supply of water divided into a main stream and a subsidiary stream; (b) a water treatment device having (1) an inlet and an outlet, the inlet for receiving the subsidiary stream into the device and the outlet for releasing the subsidiary stream from the device; (2) a body portion comprising at least two compartments, the first compartment containing water treatment composition; and (c) a flow control device controlling the flow rate of the subsidiary stream through the water treatment device; wherein the main and subsidiary streams are divided and recombined outside of the water treatment device.

In some embodiments of the device and system, a first pH monitor is included. In some embodiments of the device and system, a second pH monitor is included. In some embodiments, the first pH monitor monitors the pH of the water supply. In some embodiments, the first pH monitor monitors the pH of the treated water. In some embodiments, the second pH monitor monitors the pH of the water supply.

In some embodiments of the device and system, a flow meter that measures the flow of the subsidiary stream is included. In some embodiments, the flow meter measures the flow of the main stream.

In some embodiments of the device and system, the water treatment device includes (iii) a head portion having a plurality of channels: a first channel for directing the subsidiary stream through the water treatment device and into the first compartment, a second channel for directing the subsidiary stream only through the head portion between the inlet and the outlet thereby bypassing the first and second compartments. In some embodiments, the head portion includes a valve for preventing the subsidiary stream from flowing between the inlet and the outlet.

In some embodiments of the device and system, the first compartment is a cartridge having first and second openings, the first opening for receiving the subsidiary stream into the cartridge, and the second opening for the subsidiary stream to exit the cartridge. In some embodiments, the cartridge has a sediment filter. In some embodiments, the cartridge encloses a water-permeable bag containing the water treatment composition. In some embodiments, the water-permeable bag comprises a closable opening, the closable opening selected from the group consisting of: a zipper, stitching, hook and pile fastener, heat adhesive and contact adhesive. In some embodiments, the cartridge is releasably connected to the water treatment device.

In some embodiments of the device and system the flow control device is selected from the group consisting of: a restricting passageway, a valve, an electronic pump, an injector, and combinations of the same. In some embodiments, the pump or injector is responsive to the pH of water selected from the supply water or the treated water.

In some embodiments, an outlet line is included where outlet line is in fluid communication with the outlet of the water treatment device, the outlet line having a primary inner diameter, and wherein the flow control device constitutes a section that has a diameter smaller than the primary inner diameter of the outlet line.

In some embodiments, the water treatment composition is selected from the group consisting of: citric acid, polyphosphates, and mixtures of the same. In some embodiments, the water treatment composition is in the form selected from the group consisting of: one or more tablets, a slurry, a gel, an amorphous powder, a mixture of crystalline materials, and a concentrated solution. In some embodiments, a flow meter is included that measures the flow of a stream selected from the group consisting of: the main stream, the subsidiary stream, and both the main and subsidiary streams.

In another aspect, a water treatment container is disclosed. The water treatment container includes a flexible, water-permeable pouch having a first end having a resealable opening through which water treatment composition may be added to the container. In some embodiments, the resealable opening is selected from the group consisting of: zipper, stitching, hook and pile fastener, contact adhesive, and heat adhesive. In some embodiments, the container includes water treatment composition as previously described.

In another aspect, a method of softening water is disclosed. The method includes (a) dividing a water supply into a main stream and a subsidiary stream; (b) contacting a water treatment composition with the subsidiary stream in a water treatment device thereby dissolving a portion of the water treatment composition into the subsidiary stream; and (c) recombining the subsidiary stream carrying water treatment composition with the main stream at a controlled rate thereby softening the water supply.

In some embodiments, the main and subsidiary streams are divided and recombined outside of the water treatment device. In some embodiments, the process also includes monitoring the pH of the water supply to determine the flow rate of the subsidiary stream. In some embodiments, the pH of the treated water is monitored to determine the flow rate of the subsidiary stream. In some embodiments, the process includes monitoring the cumulative volume of the subsidiary stream and triggering an indicator when a predetermined volume is reached. In some embodiments, the flow rate of the subsidiary stream is controlled by an injector that may be operably connected to at least one pH sensor.

In yet another aspect, a water treatment device connectable to a water supply is disclosed. The device includes (a) components fixable in location to the water supply including: (1) channels for conveying a plurality of water streams including a main stream and a subsidiary stream; (2) an inlet for connecting a water supply to the treatment device for allowing water from the water supply to enter the treatment device, and an outlet through which water containing water treatment composition can leave the treatment device; (3) a flow control device capable of controlling the flow of the subsidiary stream through the water treatment device; and (b) at least one removable component that at least in part defines a chamber having a flow path for the subsidiary stream through the chamber, wherein the chamber contains water treatment composition.

In some embodiments, the flow path through the chamber is designed to maximize contact between the subsidiary stream and the surface of the water treatment composition. In some embodiments, the device has at least two compartments, the first compartment for holding water treatment composition, and the second compartment for holding the subsidiary stream. In some embodiments, the device has a removable cartridge capable of fitting within the water treatment device, the cartridge containing water treatment composition.

In still another aspect, a water treatment composition is disclosed. The water treatment composition includes citric acid and polyphosphate. In some embodiments, the ratio of polyphosphate to citric acid is in the range of about 1:40 to about 2:5 ounces. In some embodiments, the ratio may be from about 1:20 to about 1:5 ounces of polyphosphate to citric acid. In some embodiments, the ratio may be about 1:10 ounces of polyphosphate to citric acid.

BRIEF DESCRIPTION OF THE DRAWINGS

FIG. 4A depicts a cross sectional view of one embodiment of a flow control device for use in a water treatment system.

FIG. 4B depicts a cross sectional view of a second embodiment of a flow control device for use in a water treatment system.

FIG. 4C depicts a perspective view of a third embodiment of a flow control device for use in a water treatment system.

FIG. 4D depicts a perspective view of a fourth embodiment of a flow control device for use in a water treatment system.

FIG. 5A depicts a perspective view of an open water-permeable bag for use in a water treatment system.

FIG. 5B depicts a perspective view of a closed water-permeable bag for use in a water treatment system.

FIG. 5C depicts a perspective view of a second embodiment of the closed water-permeable bag for use in a water treatment system.

FIG. 6 depicts a perspective view of a second embodiment of a water treatment system with a fluid path for a water softening setting.

DETAILED DESCRIPTION

As used herein, the term "whole house" refers to a water treatment system of a structure such as a residential home. In some embodiments of the invention, the water treatment systems and components may be used for industrial applications, whole-house systems, and subsystems. In some embodiments, the water treatment systems may be isolated to specific applications, such as for treating the water supply to cleaning and hygiene subsystems that would be found in dwellings such as sinks, bathing areas, and cleaning appliances such as dishwashers and laundry machines.

In some embodiments, a water treatment system may have components that are removed for replacing water treatment composition. As used herein, the term "fixed components" are components that are not intended to be removed for replacing water treatment composition. In such systems, parts that are intended to remain in the same physical location whether in water treatment operation or in water treatment composition replacement, such components are fixed components.

As used herein, the term "removable components" refers to components that are intended to be removed for replacing water treatment composition. In such systems, parts that are intended to be removed from their physical location when replacing the water treatment composition, such components are removable components.

As used herein, the term "polyphosphates" refers to tetrahedral $PO_4$ units linked together by sharing oxygen atoms such as those depicted in the formula below.

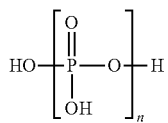

In some forms, the polyphosphates may be cyclic. In other forms, the polyphosphates may be linear.

Figure 1:
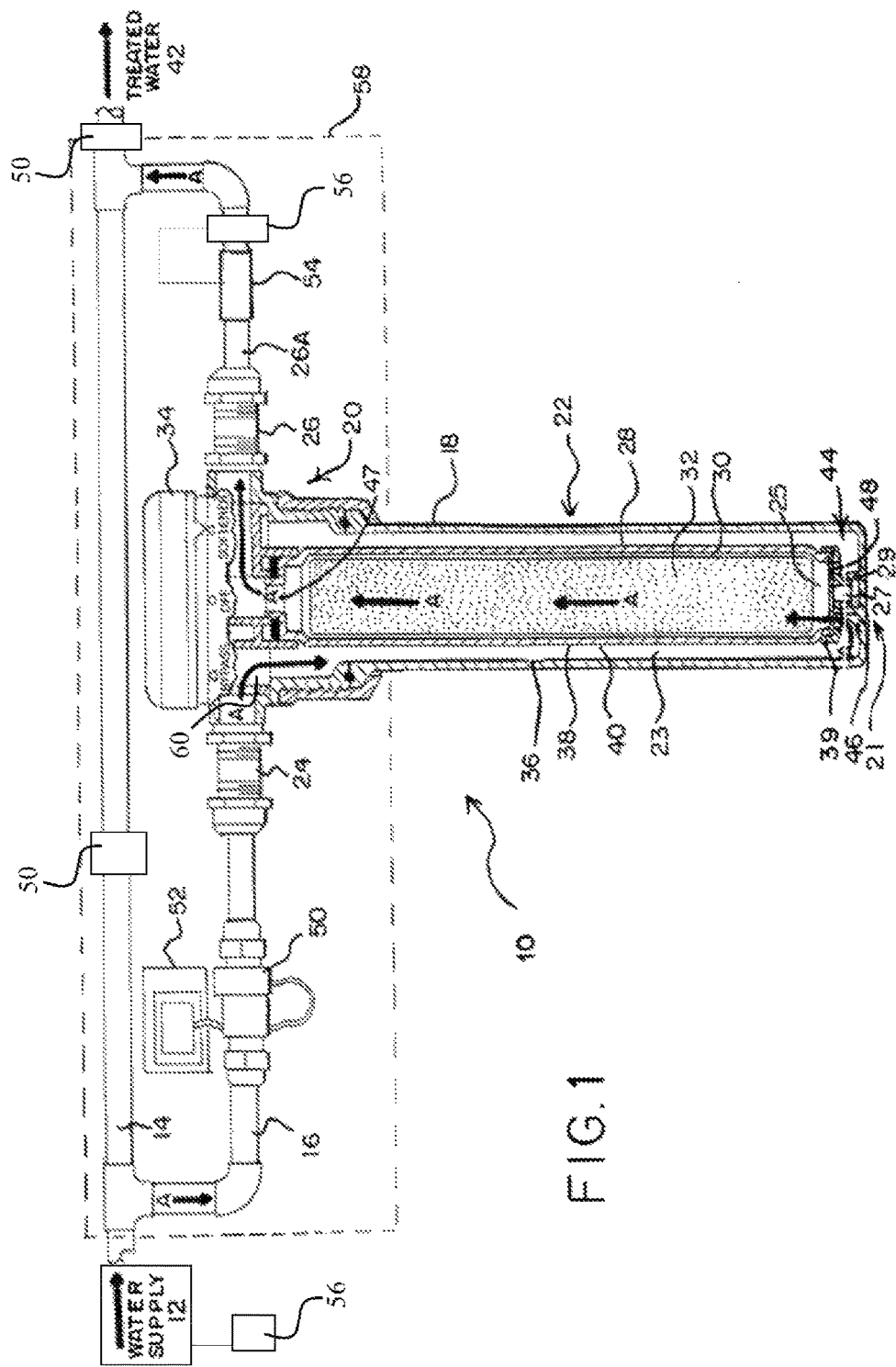
FIG. 1 depicts a partial cross sectional view of an embodiment of a water treatment system with a fluid path for a water softening setting.

The water treatment system and its various components disclosed herein may be used with various methods for treating water. An embodiment of the water treatment system is generally depicted in FIG. 1. The system 10 may be integrated into an industrial water system, a whole house water system or optionally integrated into specific water circuits with a water supply 12. In some configurations, the water supply 12 may be a line providing water from a municipal water system or a well. In other configurations, the water supply 12 may be a line branching off from a main line to supply water for a specific purpose, such as heating water or providing drinking water.

Water from the water supply 12 can be divided into a plurality of streams. In some embodiments, a first stream also called a main stream 14 can travel from the water supply to a water fixture (not shown) such as a faucet, equipment or appliance (not shown) such as a washing machine. A second stream also called a subsidiary stream 16 diverges from the water supply to a water treatment device 18. Thus, the water supply 12 is connected to the water treatment device 18 through a channel (passageway) for the subsidiary stream 16. As shown, the streams are divided at a point outside the water treatment device 18.

In some embodiments, the water treatment device 18 includes an inlet 24 and an outlet 26 through which the subsidiary stream 16 enters and exits the water treatment device 18. In some embodiments, the inlet 24 and outlet 26 are mounted into the water treatment device 18 through a head portion 20. The head portion 20 may include a plurality of channels. A first channel 60 may direct the subsidiary stream through the water treatment device 18 and into a first compartment. A second channel 61 may direct the 16 subsidiary stream only through the head portion 20 between the inlet 24 and the outlet 26 thereby bypassing the first and a second compartment. The head portion 20 may also include a valve for preventing the subsidiary stream 16 from flowing between the inlet 24 and the outlet 26.

In some embodiments, the inlet 24, outlet 26, and head portion 20 are components fixed in location to the water supply.

The water treatment device 18 includes at least two compartments surrounded by a body portion 22 of the device 18. In some embodiments, the body portion 22 may surround a water treatment container or cartridge 28 operably coupled to the head portion 20. In such a case, the cartridge 28 constitutes the second compartment 25, and the first compartment 23 is the volume within the body portion 22 not filed by the cartridge 28.

Figure 2:
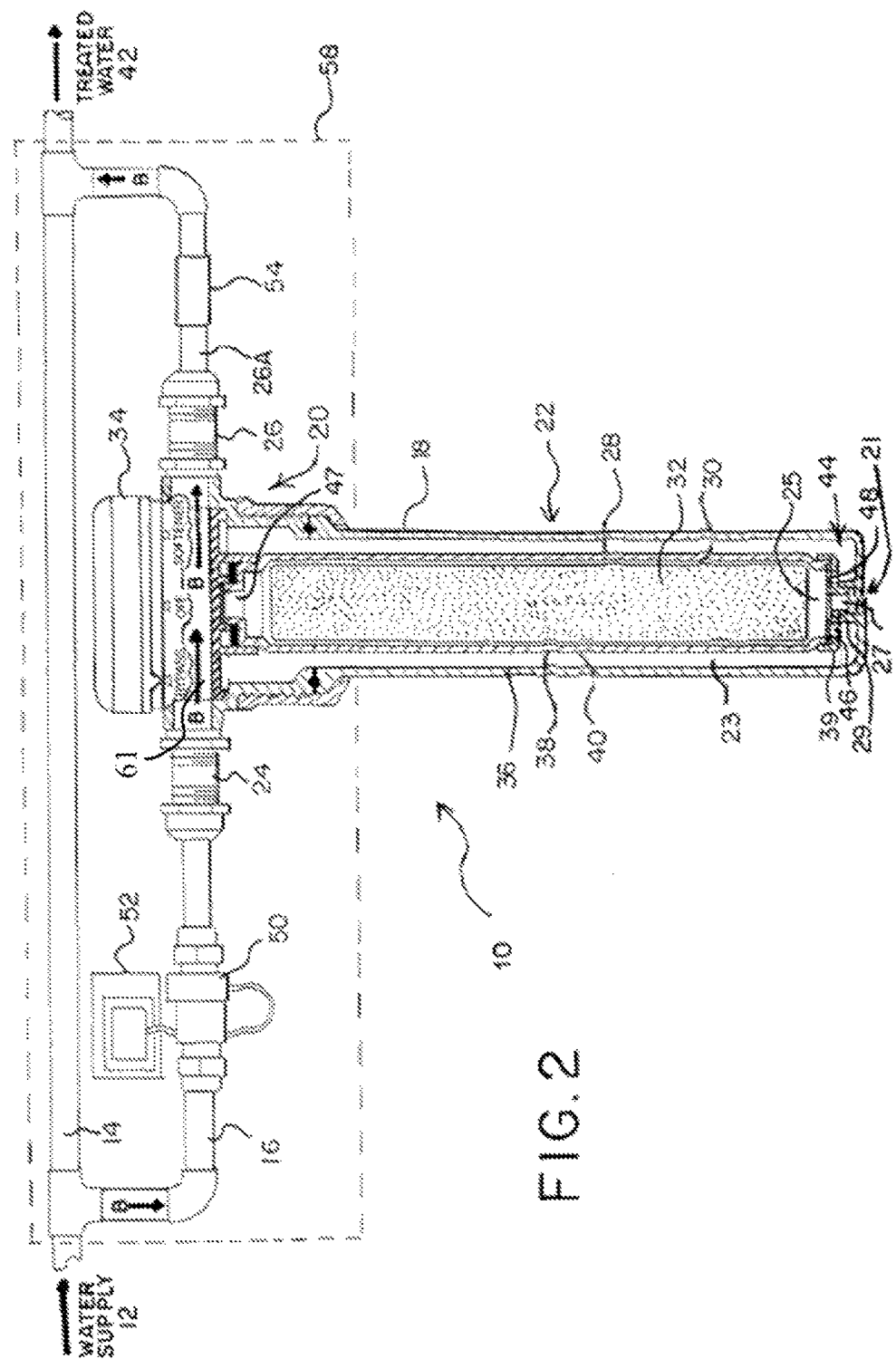
FIG. 2 depicts a partial cross sectional view of the embodiment of FIG. 1 of a water treatment system with a fluid path for bypassing water softening.
Figure 3:
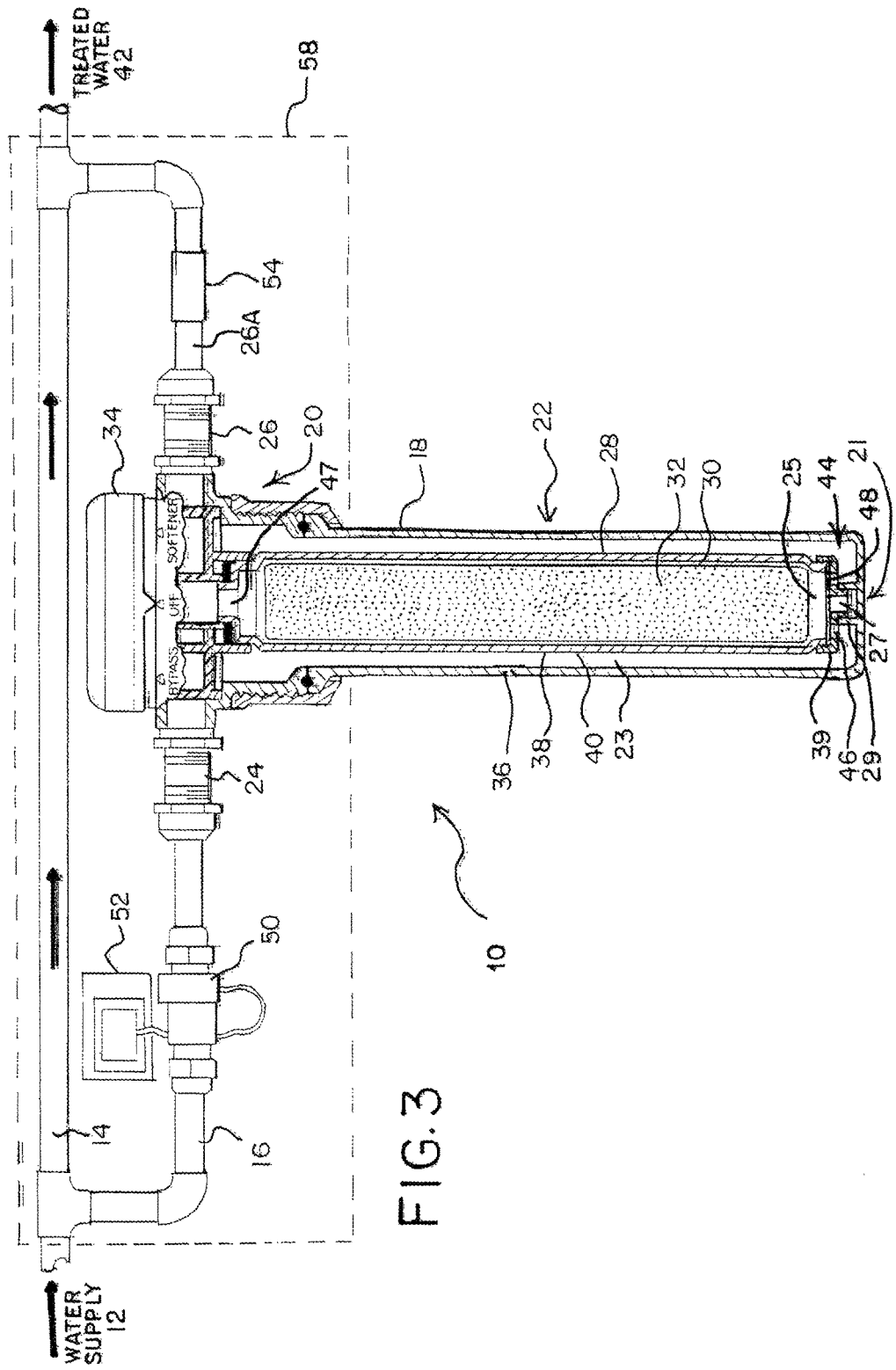
FIG. 3 depicts a partial cross sectional view of the embodiment of FIG. 1 of a water treatment system in an "off" setting.

In some embodiments such as those depicted in FIGS. 1-3, the cartridge 28 encloses water-permeable container 30 such as a water-permeable bag containing water treatment composition 32. The water-permeable container may be made of a variety of materials. Such materials include spun bound fibers such as spun bound polyethylene, polypropylene, polyesters, and similar polymeric material that are water-permeable.

As shown in FIGS. 5A, 5B, and 5C, a water-permeable bag 100 may include a zipper 102. The zipper in a closed configuration makes the water treatment composition 132 only accessible through the water-permeable material of the bag walls 108. The zipper 102 includes two corresponding sides 104 and 106 with a plurality of interlocking teeth which can releasably connect the corresponding sides 104 and 106. In an open configuration, the zipper enables an operator to add, remove, refill, or otherwise manipulate the amount of water treatment composition 132 in the water-permeable bag 100. As shown in FIG. 5A, the water-permeable bag 100 has a zipper 102 which latitudinally traverses a portion of the bag 100. In FIG. 5C, an alternate embodiment of a water-permeable bag 110 is shown. The water-permeable bag 110 includes a zipper 112 with two corresponding sides 114 and 116. As shown in this embodiment, the zipper 112 longitudinally traverses a portion of a bag wall 118.

In some embodiments, the water-permeable bag 100 may be flexible. In other embodiments, the water permeable bag 100 may be rigid.

In some embodiments, the zipper may completely traverse the entire perimeter (whether circular or some other shape) of the bag. In some embodiments, the zipper traverses only a portion of the entire perimeter of a bag.

In some embodiments, the zipper may be replaced with stitching, contact adhesive, heat-activated adhesive, hook and pile fasteners (Velcro®), plastic zippers with or without interlocking teeth and sliders. In some embodiments, the fastener for a bag or container can be releasable.

The water treatment composition 32 may be any of a variety of materials used to treat water. In some embodiments, the water treatment composition is selected from citric acid, polyphosphates, and mixtures of the same. In some embodiments, the water treatment composition includes citric acid. In some embodiments, the water treatment composition is citric acid. In some embodiments, the water treatment composition includes polyphosphates. In some embodiments, the water treatment composition is polyphosphates. In some embodiments, the water treatment composition includes citric acid and polyphosphates. In some embodiments, the water treatment composition is citric acid and polyphosphates.

When the water treatment composition includes both citric acid and polyphosphates, the proportion of the two can be selected to enhance the performance of the water treatment device or system. Advantages of such rations can include the reduction of blue water arising from dissolved copper in pH adjusted water systems having copper pipes.

For example, in smaller systems servicing water supply for a small dwelling such as would use a ¾ inch or equivalent water supply line at about 100 psi, a water treatment composition may include a ratio of from about 1:40 to about 2:5 ounces of polyphosphate to citric acid. The ratio may be from about 1:20 to about 1:5 ounces of polyphosphate to citric acid. The ratio may be about 1:10 ounces of polyphosphate to citric acid.

In some embodiments, the water treatment composition may be in the form of a compressed pellet. In those embodiments, the pellets may be in a container such as a bag, or may be added to a cartridge without being in a bag.

Returning to FIG. 1, cartridge 28 also includes a first opening 46 at a bottom portion 44. In some embodiments, the cartridge 28 may also include a sediment filter 48. The sediment filter 48 may be located downstream from the first opening 46 and adjacent the water-permeable container 30 such as is shown in FIG. 1. Alternatively, the sediment filter 48 may be located upstream from the water-permeable container 30 and adjacent to the first opening 46 such as shown in FIGS. 1-3. In some embodiments, the cartridge 28 may have an end cap 39 which can securely engage with the cartridge 28 through opposing threads. The end cap 39 may include a plurality of openings serving as the first opening 46.

The body portion 22 has a bottom 21 upon which the cartridge 28 may adjoin. In some embodiments, the bottom 21 of the body portion 22 includes one or more concentric circular ribs 29 that may support the bottom of the cartridge 28. In some embodiments, the end cap 39 has a central cavity 27 for receiving a first set of circular ribs 29. The resulting interface allows the cartridge 28 to be held in place with the body portion 22 of the water treatment device 18.

In some embodiments, the body portion 22 and cartridge 28 is removable from the head portion 20. The body portion 22 and cartridge 28, therefore, can be removable components. As shown in FIG. 1, a releasable coupling is provided between the body and the filter head for permitting removal and replacement of the cartridge. Moreover, cartridge 28 can define a chamber having a flow path for the subsidiary stream through the chamber, wherein the chamber contains water treatment composition. The flow path through the chamber is designed to maximize contact between the subsidiary stream 16 and the water treatment composition 32. In this regard, the flow path through a chamber (or compartment) substantially traverses the largest dimensional path of compartment—the cartridge 28 shown in FIG. 1 for example.

The head portion 20 may optionally include a path selector or valve 34. The path selector 34 allows an operator to direct the subsidiary stream 16 through a number of optional fluid paths traversing the water treatment device 18. For example, in one embodiment depicted in FIG. 1, the path selector 34 is indicated to be in the "softener" (or "treatment") setting which directs the subsidiary stream 16 through a fluid path A that passes from the inlet through the head and body portions 20 and 22 and out the outlet 26. The subsidiary stream 16, travelling along path A, mixes with or contacts the water treatment composition 32 and carries water charged with water treatment composition back to the main stream 14. When the subsidiary and main streams recombine, the resulting water is treated water 42.

Alternatively in the embodiment depicted in FIG. 2, the path selector 34 is indicated in the "bypass" setting which directs the subsidiary stream 16 through a fluid path B that passes from the inlet through the head portion 20 and out the outlet 26 without passing through the body portion 22. The subsidiary stream 16, travelling along path B, does not mix with water treatment composition before rejoining the main stream 14. When the subsidiary and main streams recombine, the resulting water is untreated.

In yet another embodiment depicted in FIG. 3, the path selector 34 is indicated in the "off" setting. In this setting, the subsidiary stream 16 is blocked from travelling through the water treatment device 18 from the inlet the outlet. This setting would be useful for removing removable components of the water treatment system for maintenance.

Returning to the embodiment depicted in FIG. 1, the subsidiary stream follows path A entering the water treatment device 18 at inlet 24. The subsidiary stream passes through the head portion 20 and into the body portion 22. Within the body portion 22, a cavity 40 is formed between the device wall 36 and the cartridge wall 38. Thus, the space (cavity 40) between the device and cartridge walls 36 and 38 may considered a compartment or channel. This cavity 40, also serves as a passageway through which the subsidiary stream passes through a segment of the body portion 22 of the water treatment device 18. That passageway runs between inlet 24 and the opening 46 of the cartridge 28. Thus, in some embodiments, path A includes this passageway. Moreover, path A travels over the water-permeable container 30 within the cartridge wall 38 from the first opening 46 until reaching a second opening 47 of the cartridge 28 adjacent to the head portion 20 and then exiting the water treatment device 18 through outlet 26.

Thus, in a water treatment operation, supply water 12 is divided into two paths to form a main stream 14 and a subsidiary stream 16. The subsidiary stream 16 enters the water treatment device 18 at an inlet 24, follows path A through the cartridge 28 and exits at an outlet 26 before returning to the main stream 14. While passing through the cartridge 28, the subsidiary stream 16 becomes charged with water treatment composition 32.

The water treatment system 10 may also include a flow control device 54 for controlling the flow rate of the subsidiary stream 16 through the water treatment device 18. The flow control device 54 can be located in a variety of locations, so long as it is in operable connection to the subsidiary stream 16. For example, as shown in FIG. 1, the flow control device 54 is connected to the outlet 26 via an outlet line 26A in fluid communication with the outlet 26.

The flow control device can be of a variety of different forms. For example in FIG. 4A, the flow control device is in the form of a restricting passageway 70 where a passageway 72 has a narrower diameter 74 at some point in the passageway 72 which is smaller than a wider diameter 76 of the passageway 72. The narrowness of the smaller diameter 74 may be selected so that the volume of the subsidiary stream 16 joining the mainstream 14 carries enough water treatment composition to treat the water supply 12 to a satisfactory condition (e.g. pH, composition concentration, or combination of the same).

In some embodiments, the restricting passageway 70 may have a gradual reduction diameter until a point at which the narrower diameter 74 is reached. In other embodiments, the restricting passageway may not be gradual but instead may have a disc 78 with an orifice 68 such as that depicted in FIG. 4B. The orifice 68 may be smaller than the remainder of the passageway. Depending on the desired volumetric flow, an operator can select a disc with an orifice of sufficient size to reduce the rate at which a subsidiary stream 16 traverses the passageway 70.

In another example shown in FIG. 4C, the flow control device is in the form of a valve 80. The valve may have inlet and outlet ports 86 and 88 through which a passageway 82 may traverse carrying the subsidiary stream 16. A valve member 90 opens and closes the passageway 82 by which an operator may open and close with handle 84. A variety of valves may be used such as ball, butterfly, and disc valves.

In another example shown in FIG. 4D, the flow control device is in the form of a pump 92. The pump 92 includes inlet and outlet ports 94 and 96, and a pump member 98. The pump member 98 increases or decreases the rate of flow between the inlet and outlet ports 94 and 96 in response to electrical or mechanical force. A variety of pumps may be used such as a positive displacement, velocity, and centrifugal pumps.

In some embodiments, the flow control device 54 may be operably connected to another device such as a pH sensor, flow meter, or other sensor dynamically responsive to some condition of the water treatment system 10 as discussed further herein.

The flow control device 54 may be located in a variety of locations. In one embodiment, for example in FIGS. 1-3, the flow control device may be located downstream from the outlet 26 but at a point upstream from where the subsidiary and main streams 14 and 16 recombine.

In some embodiments, the water treatment system optionally includes a flow meter 50 for measuring the flow of various streams. The flow meter 50 can be located in a variety of locations. For example, the embodiment depicted in FIGS. 1-3 has a flow meter 50 located upstream from the inlet 24 but downstream from a point where the main and subsidiary streams 14 and 16 separate. In this embodiment, the flow meter 50 measures the volume of the subsidiary stream 16.

In another embodiment, the flow meter 50 can be located upstream from where the main and subsidiary streams 14 and 16 separate. In this embodiment, the flow meter 50 measures the total volume of untreated water operating with the system which is the sum of the main and subsidiary streams 14 and 16.

In another embodiment, the flow meter 50 can be located downstream from the point where the main and subsidiary streams 14 and 16 separate but instead of measuring the subsidiary stream 16, the flow meter 50 in this location measures the volume of water in the main stream 14.

In still another embodiment, the flow meter 50 can be located downstream from the point where the main and subsidiary streams 14 and 16 come together. In this embodiment, the flow meter 50 measures the total volume of treated water operating with the system which is the sum of the main and subsidiary streams 14 and 16. In another embodiment the flow meter 50 can be located in the main stream 14.

The flow meter may be operably connected to a flow indicator 52. The flow indicator 52 may be electronic device displaying one or more values of information. In some embodiments, the flow indicator 52 may display a cumulative value representing the volume of water measured by the flow meter 50.

In some embodiments, the flow indicator 52 may display a value computed from the difference between a preset value and the total flow measured by the flow indicator. In such an embodiment, an operator may set the preset value to correspond with a total water treatment capacity associated with the water treatment composition within a fresh cartridge 28. For example, if the amount of water treatment composition in a freshly loaded cartridge is capable of treating 100,000 gallons, then the flow indicator may display the difference between the 100,000 gallon preset value and the cumulative volume which has passed through the flow meter 50. Thus, after loading a fresh cartridge, the flow indicator 52 would indicate the preset value (e.g. 100,000 gallons). After the system has operated for some period of time and a total volume of 25,000 gallons has been measured by the flow meter 50, the flow indicator 52 would indicate a volume of 75,000 gallons. After the system has operated for a longer period of time and a total volume of 75,000 gallons has been measured by the flow meter 50, the flow indicator 52 would indicate a volume of 25,000 gallons. Thus, when the flow indicator approaches a zero value, an operator would understand that a new supply of water treatment composition will need to be added to the system.

In some embodiments, an indicator can display a time value. In such embodiments, the indicator could display a time value corresponding to the amount of time remaining before a new supply of water treatment composition will need to be added to the system or has been in use. In some embodiments, the time value could be correlated to the flow rate using flow meter 50 which measures volume passing through the system or a portion of the system. Alternatively, the displayed time value may be calculated based on an average rate at which the flow meter 50 measures volume passing through the system or a portion of the system.

Alternatively, the flow indicator could indicate a time value corresponding to the total time the water treatment composition has been used by the system. In such embodiments, the indicator can be set or reset by an operator when water treatment composition is added to the system. The indicator would then measure the time elapsed since the indicator was set or reset by the operator. Alternatively, the flow indicator could indicate a time value corresponding to the total time the water treatment composition could be used by the system. In this embodiment, the indicator can be set to a predetermined time period by an operator that corresponds to a period in which it is expected that the water treatment composition will be consumed (or a period which is just less than that). The indicator would then identify the remaining time so that an operator can anticipate and obtain replacement water treatment composition before, at, or after the indicator displays that the predetermined time has elapsed.

In yet another alternative, the flow indicator could indicate a status of the water treatment composition. A variety of status indications may be used. For example, the status indicators may be "Good," "Order," and "Replace." The "Good" indicator may be shown when the system operates with a sufficient amount of water treatment composition. The "Order" indicator may be shown when a short period of time (or a limited volume of water) remains which can be appropriately treated by the remaining water treatment composition. The "Replace" indicator may be shown when the amount of time that has elapsed since the indicator was set or reset (or the volume of water treatable by the composition) has been detected by the flow meter thereby indicating to an operator that the water treatment composition must be replaced or recharged. Intervals could also be shown by an indicator such as intervals of 10% up to 100% may also be displayed. Similarly, intervals such as by weeks, months, days, etc. may also be displayed.

In one embodiment, the flow indicator could be triggered to indicate the need to replace a cartridge based on whichever criteria is met first, namely a predetermined volume or a predetermined time.

In some embodiments, the system may also include a pH sensor 56. The pH sensor 56 can be located in a variety of locations. The pH sensor 56 can measure the pH of the untreated water. For example, the pH sensor 56 can be located upstream from the inlet 24 but downstream from a point where the main and subsidiary streams 14 and 16 separate. In this embodiment, the pH sensor 56 measures the pH of the subsidiary stream 16 before it contacts the water treatment composition 32 in the cartridge 28. In another embodiment, the pH sensor 56 can be located upstream from where the main and subsidiary streams 14 and 16 separate. In this embodiment, the pH sensor 56 measures the pH of the water supply 12. In another embodiment, the pH sensor 56 can be located downstream from the point where the main and subsidiary streams 14 and 16 separate thereby measuring the pH of the main stream 14.

The pH sensor 56 can also measure the pH of treated water. In that instance, the pH sensor 56 can be located downstream from the point where the main and subsidiary streams 14 and 16 come together. In this embodiment, the pH sensor 56 measures the pH of the treated water. In another embodiment, the pH sensor 56 can measure the pH of the subsidiary stream. In that instance, the pH sensor is located at a point before the main and subsidiary streams recombine.

The pH sensor 56 may be operably connected to the flow control device 54. In such embodiments, the pH sensor can sense the pH of the water supply 12 and actuate the flow control device to increase or decrease the volume of subsidiary stream 16 which is joined to the main stream 14. For example, the pH sensor may sense that the pH of the treated water (at a point downstream from where the main and subsidiary streams combine) is too basic. In such a case, the flow control device 54 increases the volume of subsidiary stream 16 to draw more water treatment composition into the treated water. Similarly, the pH sensor may sense that the pH of the treated water that is too acidic. In such a case, the flow control device 54 decreases the volume of subsidiary stream 16 to reduce the amount of water treatment composition going into the treated water.

In another example, the pH sensor 56 may sense that the pH of the water supply 12 has a pH value greater than expected. In such a case, the flow control device 54 increases the volume of subsidiary stream 16 to draw more water treatment composition into the treated water. Similarly, the pH sensor may sense that the pH of the water supply is too acidic. In such a case, the flow control device 54 decreases the flow of subsidiary stream 16 to reduce the amount of water treatment composition going into the treated water.

In these examples, the pH sensor may be substituted with a mineral detection device which dynamically detects the amount of minerals in the water supply (such as calcium, magnesium, or other such minerals). As the amount of dissolved minerals increases in the water supply, the flow control device 54 can be modulated to increase the volume of subsidiary stream 16 thereby increasing the amount of water treatment composition delivered into the treated water. Conversely, as the amount of dissolved minerals decreases in the water supply, the flow control device 54 can be modulated to decrease the volume of subsidiary stream 16 thereby decreasing (or eliminating) the amount of water treatment composition delivered into the treated water.

In some embodiments, the water treatment system may include both a pH sensor and a mineral detection device which both affect the flow control device. Such devices, since they are dynamic, can prevent excess consumption of the water treatment composition, thereby reducing unnecessary use and expense.

In those embodiments using a flow control device 54 which is not dynamic, such as the one depicted in FIG. 4A, an operator can determine the amount of water treatment composition necessary for treating the water and select a corresponding device which is restrictive enough to limit the subsidiary stream 16 passing through the water treatment device 18. In some embodiments, the flow control device 54 is modular such that it can be removed and replaced with another flow control device that restricts the subsidiary stream 16 appropriate for measurements taken on an infrequent basis by an operator.

In some embodiments, the main and subsidiary streams and a portion of the water treatment device are contained within an enclosure 58, such as shown in phantom in FIGS. 1-3. Such enclosures may be implemented for aesthetic purposes and have openings for the water supply to enter and exit as well as an opening for some portion of the treatment device to extend out of the enclosure 58.

In operation, the device depicted in FIG. 1 enables one to soften water by dividing a water supply into a main stream and a subsidiary stream; contacting a water treatment composition with the subsidiary stream in a water treatment device thereby dissolving a portion of the water treatment composition into the subsidiary stream; and recombining the subsidiary stream carrying water treatment composition with the main stream at a controlled rate thereby softening the water and resulting in treated water. As shown in FIG. 1, the main and subsidiary streams are divided and recombined outside of the water treatment device. The method may also include optional pH monitoring such as of the subsidiary stream, water supply, or treated water. Such monitoring may be integrated with a flow control member to determine the flow rate of the subsidiary stream. An optional monitory may be used to display the cumulative value of the subsidiary stream and include an indicator for alerting a user when a predetermined volume is reached.

In another embodiment shown in FIG. 6, a water treatment system 210 may be integrated into an industrial water system, a whole house water system or optionally integrated into specific water circuits with a water supply 212. Water from the water supply 212 can be divided into a plurality of streams including a main stream 214 and a subsidiary stream 216. The subsidiary stream 216 diverges away from the water supply to a water treatment device 218. As shown, the streams are divided at a point outside the water treatment device 218 but inside an enclosure 262.

The enclosure 262 may include a variety of optional components such as a display 260 which may identify information from a flow meter 250 or a timer for tracking the volume of treated water or the time the water treatment system has been treating water. Various buttons can be operably connected to the display 260 to select settings of displaying volume or time, or for resetting the meter to start from a start value. In some embodiments, the display may indicate a volume such as liters or gallons or a time value.

The enclosure 262 may also have a pH sensor display 256 in operable connection to one or more pH sensors 258. The display could show the pH of the untreated water supply 212 and the treated water depending upon where the sensor 258 is located. As shown in FIG. 6, a pH sensor 258 is located at a point downstream from where the main and subsidiary streams 214 and 216 are recombined.

Like the embodiment shown in FIG. 1, the subsidiary stream 216 enters the water treatment device through an inlet 224, passes through the device in a softening setting and out an outlet 226.

Inside the enclosure 262, the outlet may lead to an injector 255 which acts as the flow controller. The injector 255 can be operably connected to the flow meter 250 and/or pH sensor 258 so that signal from the flow meter or pH sensor detects that more water treatment is appropriate. In such a condition the injector 255 increases the relative flow of the subsidiary stream 216. Alternatively, the flow meter or pH sensor detects that less water treatment is appropriate. In such a condition, the injector 255 decreases the relative flow of the subsidiary stream 216.

Figure 7:
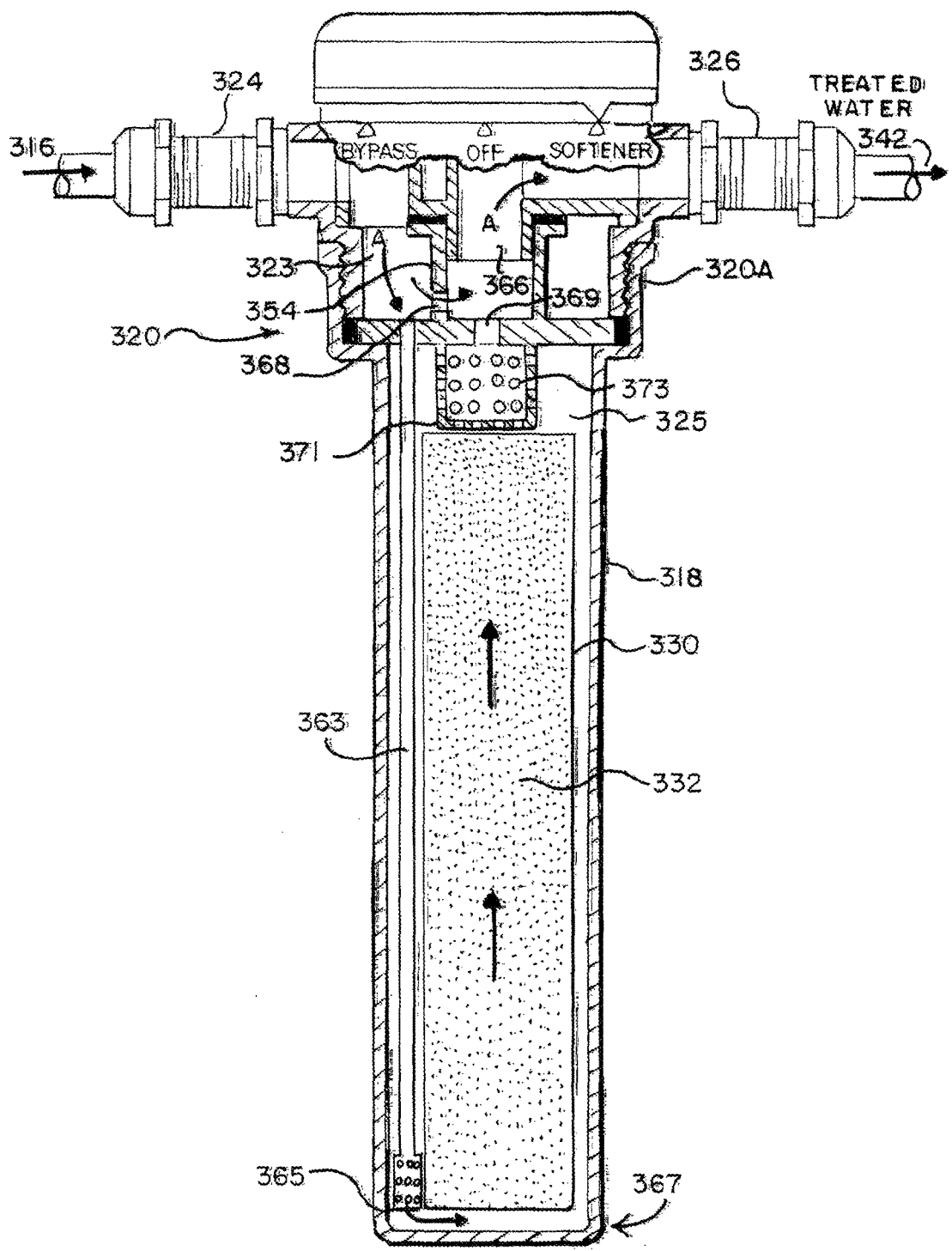
FIG. 7 depicts a partial cross sectional view of a third embodiment of a water treatment system with a fluid path for a water softening setting.

In another embodiment depicted in FIG. 7, water treatment device 318 includes an upper compartment 323 and a lower compartment 325. The upper compartment 323 substantially surrounds the bottom segment 320A of the head portion 320. The lower compartment 325 can contain water treatment composition 332 such as contained within a water-permeable container 330, a bag for example.

The subsidiary stream 316 can pass through an inlet 324 to the upper compartment 323 and then to the lower compartment 325 through an extended passageway 363 to a deflecting baffle 365 located near the bottom 367 of the water treatment device 318. Therein the flow path through the lower compartment substantially traverses the largest dimensional path of the lower compartment.

In this embodiment, the water treatment device 318 also includes a flow restricting flow control body 354. The flow control body 354 may be integrated or fixed with the center of the head and concentric with a channel 366 leading up through the head and out the water treatment device 318 through an outlet 326. The flow control body may be in fluid communication with both the upper and lower compartments 323 and 325.

The flow control body 354 can connect to the lower compartment 325 through a bridging channel 369 and baffle 371. The baffle can include a plurality of holes 373 through which water from the subsidiary stream 316 that has passed over the water-permeable container 330 may pass into the flow control body 354. The subsidiary stream may then exit through outlet 326 and mix with main stream 314 yielding treated water 342.

The flow control body 354 can connect to the upper compartment 323 through a connecting passageway 368, which in some embodiments, is substantially perpendicular to a central axis of the water treatment device 318. The diameters of the connecting passageway 368 and bridging channel 369 may be selected to affect the volume of the subsidiary stream passing into the second compartment and, therefore, over the water-permeable container 330 and water treatment composition 332. The larger the diameter of the bridging channel 369, the greater the volume of subsidiary stream 316 that will contact the water treatment composition 332. In contrast, the larger the diameter of the connecting passageway 368, the less volume of water of the subsidiary stream 316 that will contact the water treatment composition 332.

Figure 8:
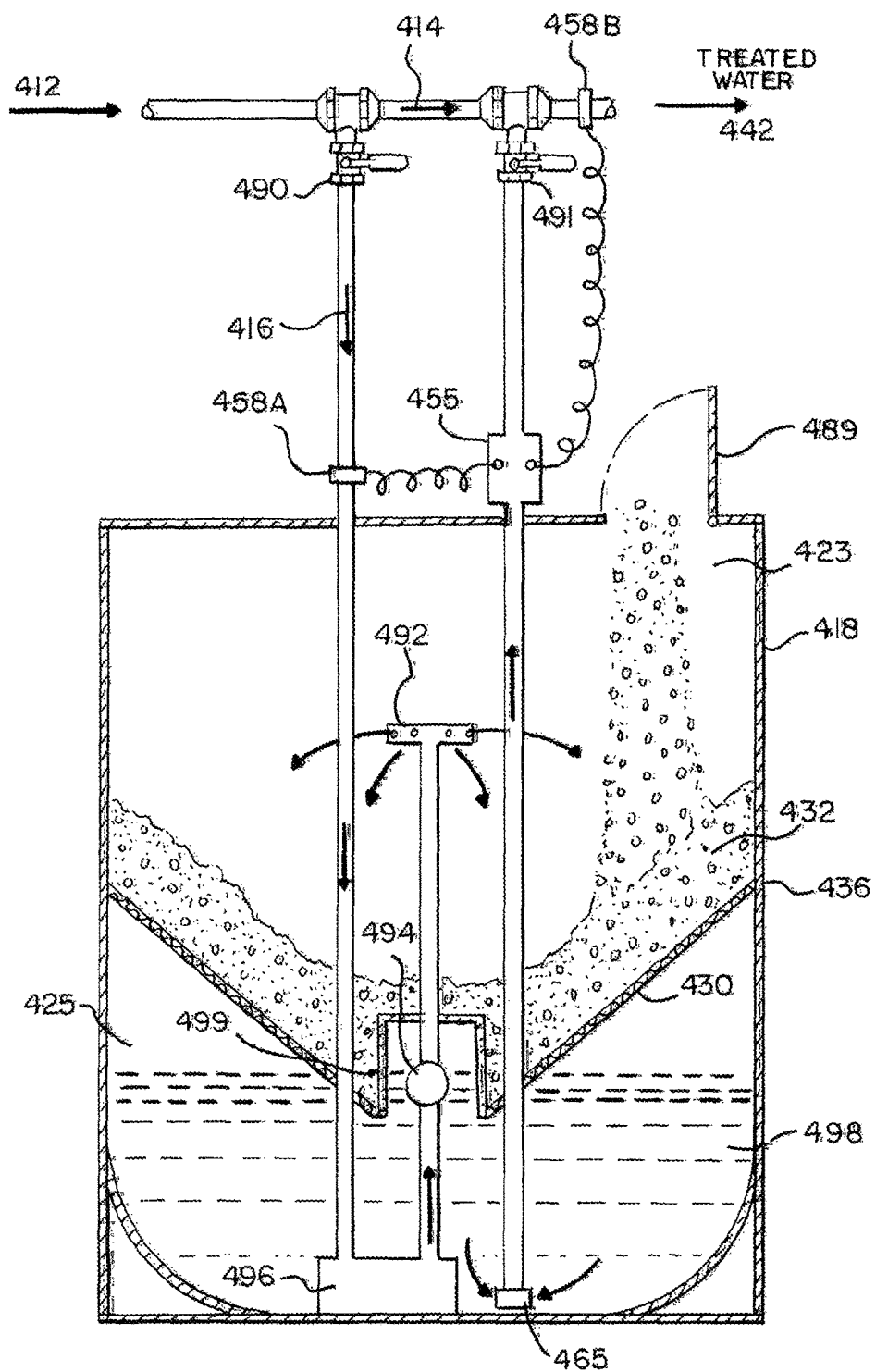
FIG. 8 depicts a partial cross sectional view of a fourth embodiment of a water treatment system with a fluid path for a water softening setting.

In another embodiment depicted in FIG. 8, a water treatment device 418 has an upper compartment 423 and a lower compartment 425. The upper and lower compartments 423 and 425 are separated and adjoin one another by a water-permeable material 430 which slopes from a higher elevation at the device wall 436 to a lower elevation near the center of the device 418. The upper compartment 423 can be filled with water treatment composition 432 through an access door 489. The water treatment composition can be of a variety of forms, including pellets and compressed pellets.

In the embodiment of FIG. 8, a water supply 412 is divided into a plurality of streams including a main stream 414 and a subsidiary stream 416. An optional valve 490 can be used to stop flow of subsidiary stream 416 to the water treatment device 418 at a point between the water treatment device 418, and the point at which the main stream and subsidiary streams are divided. Moreover, an optional valve 491 can be used to stop flow of subsidiary stream 416 to rejoin the main stream 414.

Subsidiary stream 414 enters the water treatment device 418 and travels to a float valve 496. In some embodiments, the float valve 496 is in the second compartment 425 as shown in FIG. 8. The float valve 496, however, can also be located in the first compartment in other embodiments. A float 494 is operably connected to the float valve 496. The subsidiary stream travels from the float valve 496 to internal tank outlet 492. The internal tank outlet may be in the form of a sprayer so that the subsidiary stream is sprayed or dispersed into the upper compartment 423 and onto the water treatment composition 432. The subsidiary stream 416 then passes through the water-permeable material 430 driven by gravity accumulating into the lower compartment 425. When the volume of the subsidiary stream accumulates to a predetermined level, float 494 closes float valve 496 so as to prevent the water treatment device from overflowing with water. In some embodiments, float 494 does not close float valve 496 until the height of the accumulated subsidiary stream 498 is at a height greater than the lowest elevation of the water treatment composition in the second compartment 425.

Accumulated subsidiary stream 498 exits the water treatment device 418 through an intake baffle 465 located at the bottom of the second compartment 425. The volume of subsidiary stream 416 exiting the water treatment device 418 is controlled by a flow control device. The flow control device can be an injector 455 that is operably connected to one or more pH sensors. In FIG. 8, the water treatment system 410 includes a first pH sensor 458A and a second pH sensor 458B. The first pH sensor can be located at a point upstream from where the subsidiary stream 416 contacts the water treatment composition 432, for example outside of the water treatment device 418 but at a point after the subsidiary stream 416 divides from the main stream 414. A second pH sensor can be located at a point downstream from where the subsidiary stream 416 contacts the water treatment composition 432, for example outside the water treatment device 418 at a point after the subsidiary stream 416 recombines with the main stream 414. When the pH sensors call for additional water treatment, the injector 455 can increase the flow rate of the subsidiary stream 416 combining with the main stream 418 thereby carrying more water treatment composition 432 into the treated water.

In another embodiment, a water treatment system main includes a plurality of streams, including a main stream to be treated and a subsidiary stream carrying water treatment composition. In an embodiment, the subsidiary stream may originates from a tank containing water and water treatment composition. The water in the tank can be saturated or less than saturated but set to a specified concentration. Water from the tank is then fed through a flow control such a pump or injector combining with the main stream treated water. In some embodiments, the flow control is operably connected to a pH sensor which can be located on the main stream or at a point downstream from where the subsidiary and main streams converge.

A variety of pumps and injectors are available with programmed flow rates based on pH input from pH sensors. For example, one such injector is available from Injecta® Reita, Italy.

Although the invention has been described with reference to the accompanying sheets of drawings, further modifications may be made while still falling within the same inventive principles stated in the appended claims.

What is claimed is:

1. A water treatment device connected to a water supply comprising:
   components fixed in location to the water supply including:
      channels for conveying a plurality of water streams, including
      a water supply line for supplying water to be treated;
      a treated water line for receiving treated water;
      a main stream line having an inlet end connected to the water supply line at a first pipe connection and an outlet end connected to the treated water line at a second pipe connection;
      an inlet subsidiary stream line having an inlet end connected to the first pipe connection and an outlet end;
      an outlet subsidiary stream line having an inlet end and an outlet end connected to the second pipe connection;
      a filter head having a head inlet connected to the outlet end of the inlet subsidiary stream line and a head outlet connected to the inlet end of the outlet subsidiary stream line;
      a body connected to the filter head;
      a cartridge positioned inside the body such that a cavity is formed between the cartridge and an inner surface of the body;
      wherein the filter head defines an inlet channel that connects the head inlet to the cavity and an outlet channel that connects the cavity to the head outlet;
      a pH sensor disposed in the water supply line for measuring a pH of the water to be treated;
      a pump connected in the outlet subsidiary stream line, wherein the pump is operably connected to the pH sensor and is configured to increase a flow rate in the outlet subsidiary stream upon an increase in the pH of the water to be treated and to decrease a flow rate in the outlet subsidiary stream upon a decrease in the pH of the water to be treated
   wherein the cartridge contains a water treatment composition.

2. A water treatment system comprising:
   a water supply line for supplying water to be treated;
   a treated water line for receiving treated water;
   a main stream line having an inlet end connected to the water supply line at a first pipe connection and an outlet end connected to the treated water line at a second pipe connection;
   an inlet subsidiary stream line having an inlet end connected to the first pipe connection and an outlet end;
   an outlet subsidiary stream line having an inlet end and an outlet end connected to the second pipe connection;
   a filter head having a head inlet connected to the outlet end of the inlet subsidiary stream line and a head outlet connected to the inlet end of the outlet subsidiary stream line;
   a body connected to the filter head;
   a cartridge containing a water treatment composition positioned inside the body such that a cavity is formed between the cartridge and an inner surface of the body;
   wherein the filter head defines an inlet channel that connects the head inlet to the cavity and an outlet channel that connects the cavity to the head outlet;
   a pH sensor disposed in the water supply line for measuring a pH of the water to be treated;
   a pump connected in the outlet subsidiary stream line, wherein the pump is operably connected to the pH sensor and is configured to increase a flow rate in the outlet subsidiary stream upon an increase in the pH of the water to be treated and to decrease a flow rate in the outlet subsidiary stream upon a decrease in the pH of the water to be treated; and
   a flow meter that measures the flow of the main stream.

3. The system of claim 2, further comprising a flow meter that measures the flow in the inlet subsidiary stream line.

4. The system of claim 2, wherein the filter head further comprises a valve configured for directing water in the inlet subsidiary stream line only through the filter head from the head inlet to the head outlet thereby bypassing the cavity.

5. The system of claim 4, wherein the valve is configured to block the flow of water from the head inlet to the head outlet.

6. The system of claim 2, wherein the cartridge has first and second openings, the first opening for receiving water from the inlet subsidiary stream line into the cartridge, and the second opening releasing water to the inlet end of the outlet subsidiary stream line.

7. The system of claim 6, wherein the cartridge encloses a water-permeable bag containing the water treatment composition.

8. The system of claim 7, wherein the water-permeable bag comprises a closable opening, the closable opening selected from the group consisting of: a zipper, stitching, hook and pile fastener, heat adhesive and contact adhesive.

9. The system of claim 6, further comprising a releasable coupling between the body and the filter head for permitting removal and replacement of the cartridge.

10. A method of softening water, comprising:
    directing water into a water treatment device connected to the water supply comprising:
       a water supply line for supplying water to be treated;
       a treated water line for receiving treated water;
       a main stream line having an inlet end connected to the water supply line at a first pipe connection and an outlet end connected to the treated water line at a second pipe connection;
       an inlet subsidiary stream line having an inlet end connected to the first pipe connection and an outlet end;
       an outlet subsidiary stream line having an inlet end and an outlet end connected to the second pipe connection;
       a filter head having a head inlet connected to the outlet end of the inlet subsidiary stream line and a head outlet connected to the inlet end of the outlet subsidiary stream line;
       a body connected to the filter head;
       a cartridge containing a water treatment composition positioned inside the body such that a cavity is formed between the cartridge and an inner surface of the body;
       wherein the filter head defines an inlet channel that connects the head inlet to the cavity and an outlet channel that connects the cavity to the head outlet;
       a pH sensor disposed in the water supply line for measuring a pH of the water to be treated;
       a pump connected in the outlet subsidiary stream line, wherein the pump is operably connected to the pH sensor and is configured to increase a flow rate in the outlet subsidiary stream upon an increase in the pH of the water to be treated and to decrease a flow rate in the outlet subsidiary stream upon a decrease in the pH of the water to be treated;

contacting a water treatment composition with the water in the water treatment device thereby dissolving a portion of the water treatment composition into the water.

* * * * *